No. 794,352. PATENTED JULY 11, 1905.
V. GEBHARDT.
FISH HOOK.
APPLICATION FILED DEC. 5, 1904.

Witnesses
C. M. Catlin.
Cyrus Smith

Inventor
Victor Gebhardt,
By T. W. Tallmadge
Attorney

No. 794,352.

Patented July 11, 1905.

UNITED STATES PATENT OFFICE.

VICTOR GEBHARDT, OF ST. LOUIS, MISSOURI.

FISH-HOOK.

SPECIFICATION forming part of Letters Patent No. 794,352, dated July 11, 1905.

Application filed December 5, 1904. Serial No. 235,584.

*To all whom it may concern:*

Be it known that I, VICTOR GEBHARDT, a citizen of the United States, residing at St. Louis, State of Missouri, have invented new and useful Improvements in Fish-Hooks, of which the following is a specification.

The invention relates to double fish-hooks provided with a bait-holding attachment, and is an improvement on the device described in my Patent No. 699,304, dated May 6, 1902.

The objects of the invention are to provide, in connection with two hooks, means for more conveniently manipulating the bait-holder and to adapt the latter for fending off objects in water and to secure a compact adjustment of the holder and double hooks when in actual use.

The invention consists in the construction hereinafter described and pointed out.

Figure 1:
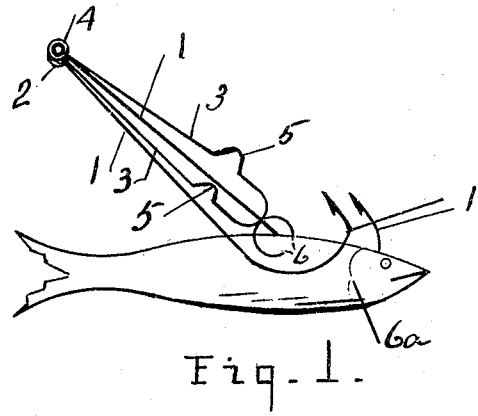
Figure 2:
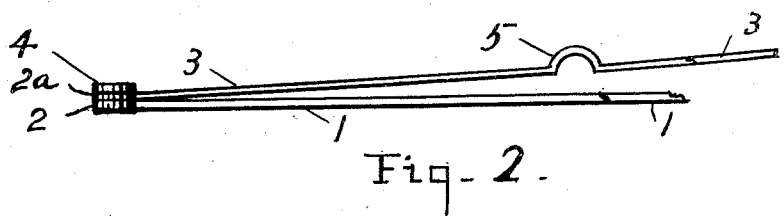
Figure 3:
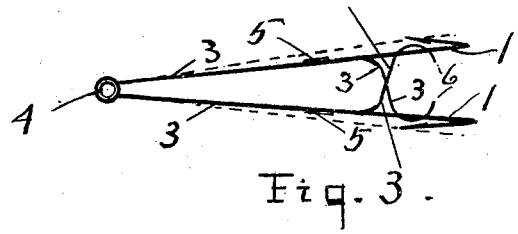
Figure 4:
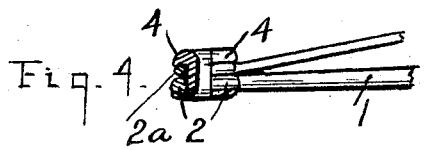

In the accompanying drawings, forming part of this specification, Figure 1 is a perspective view of a double hook with improvement attached. Fig. 2 is an enlarged partial side view, and Fig. 3 is a plan view, of the device as shown in Fig. 1, the bait being omitted. Fig. 4 is an enlarged side view of the connected end of the hooks and bait-holder, a part being broken away to show the connecting-eyelet.

Numeral 1 denotes two hooks joined by an open ring 2, integral with the hook-shanks. 3 denotes a bait-holder having two members connected by a similar ring $2^a$.

4 indicates an eyelet fixing together the hooks and bait-holder, which are of usual form, except that each member of the holder is provided with a bend 5, as shown, whereby they may be pressed toward each other to open the bait-holding hooks 6 for the insertion and securing of bait $6^a$—such as minnows, shrimp, grasshoppers, and the like.

The holder members are normally situated outside the hook-shanks, as indicated by the dotted lines in Fig. 3, so that when pressed together by use of extensions 5 to open the bait-holding hooks to receive bait they will be moved to a situation in planes lying within and parallel to the hook-shanks. By this construction it is provided that when the said members are released from the fingers to cause the hooks 6 by the elasticity of the holder members to engage the bait they will lie immediately over and close to the hook-shanks, as indicated in Fig. 3, whereby they are the least liable to attract the attention of the prey. The projecting bends or thumb-pieces 5 provide that the members of the holder may be pressed toward each other to spread hooks 6 without pressing together the main hooks, whereby the introduction of bait would be obstructed.

Preferably the bait-holding members and the hook-shanks lie as nearly in one and the same plane as practicable, excepting, of course, the bends 5. This prevents grass or other obstructions getting between the bait-holder and hook-shanks.

Having thus described the invention, what I claim is—

1. The double fish-hook having a bait-holder comprising two members in close proximity to the hook-shanks and normally extending outside the same.

2. The double fish-hook having a bait-holder comprising two members in close proximity to the hook-shanks and normally extending outside the same, each member having a thumb-piece for compressing the holder to open the bait-holding hooks without moving the main hooks.

3. The double fish-hook having a bait-holder of two members, each member being provided with a thumb-piece.

4. The double fish-hook, the bait-holder having members situated closely adjacent the hook-shanks, and means for manipulating the said members independently of the said shanks.

In testimony whereof I have hereunto set my hand in presence of two subscribing witnesses.

VICTOR GEBHARDT.

Witnesses:
  W. CASEY JENKINS,
  GEO. E. BOKLEY.